July 10, 1928.
W. A. PERVIER
1,676,412
ALARM SIGNAL FOR AUTOMOBILES
Filed Jan. 16, 1926
2 Sheets-Sheet 1
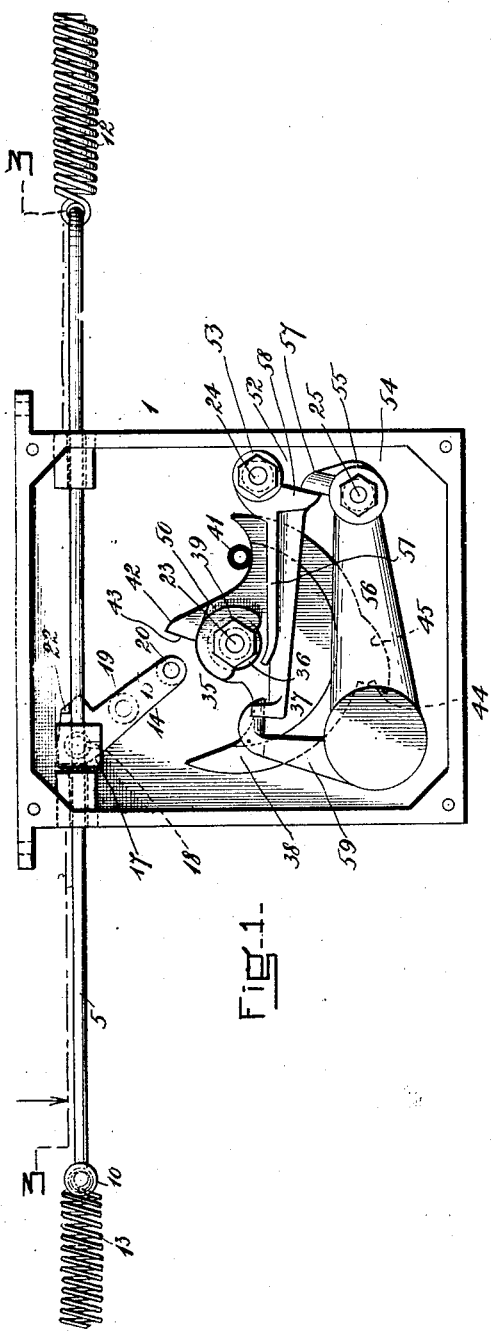
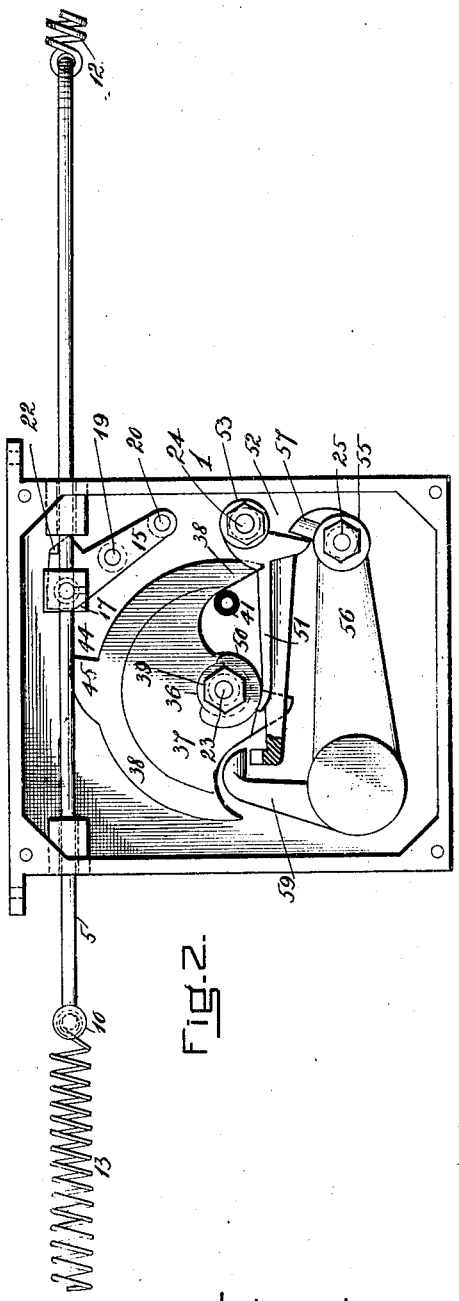
INVENTOR:
William A. Pervier
BY Coate & Mayer
ATTORNEYS

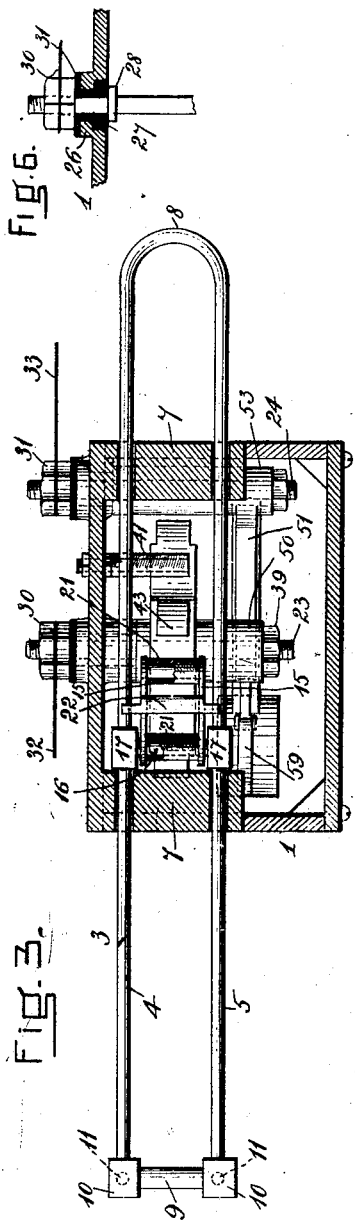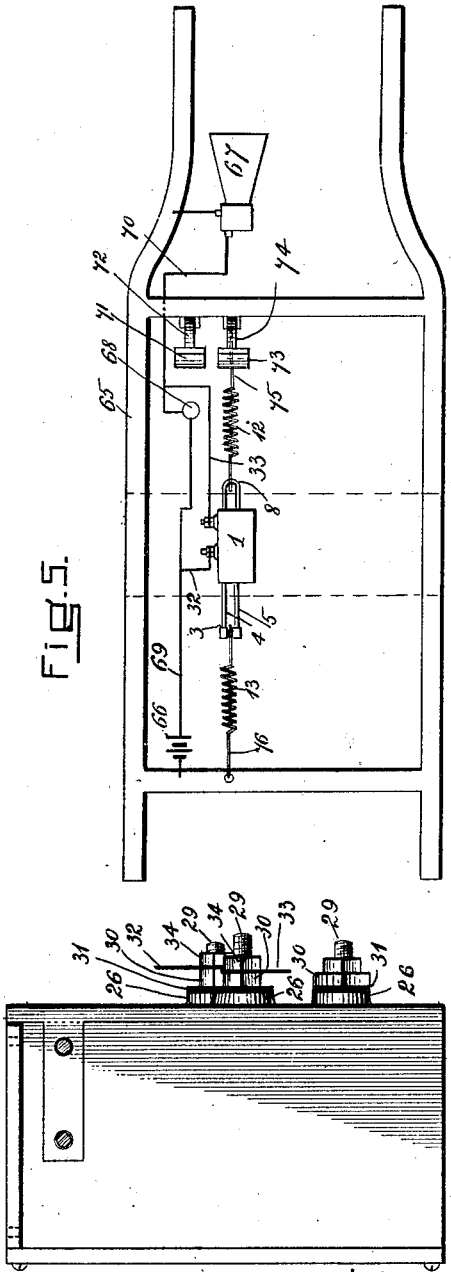

Patented July 10, 1928.

1,676,412

UNITED STATES PATENT OFFICE.

WILLIAM A. PERVIER, OF WATERTOWN, MASSACHUSETTS, ASSIGNOR, BY MESNE ASSIGNMENTS, TO WILLIAM A. PERVIER, TRUSTEE.

ALARM SIGNAL FOR AUTOMOBILES.

Application filed January 16, 1926. Serial No. 81,773.

The invention relates to an alarm signal for automobiles to be exercised especially in the event of emergency and this by sounding the horn. Occasion often arises during the driving of an automobile when it is necessary to quickly and forcibly apply the foot brake, turn the steering gear and also to sound the horn, as for example when the driver unexpectedly approaches a pedestrian or meets other contingencies requiring quick action. In such case the first impulse of the driver is to forcibly apply the foot brake and he may also turn the steering gear. Often, however, he neglects to sound the horn, and the object of the invention is to provide a mechanism or device to meet such contingency or, in other words, to provide means by which the horn will automatically be sounded when the foot brake, and only when the foot brake is quickly and forcibly applied but not otherwise. That is, no automatic sounding of the horn is effected during the ordinary application of the foot brake, but only when the foot brake is quickly and forcibly applied in case of emergency as aforesaid.

The invention can best be seen and understood by reference to the drawings, in which—

Figure 1 is a front elevation of the attachment with the cover of the casing, which contains certain of the operating parts, removed.

Fig. 2 is the same as Fig. 1 excepting that the operating parts within the casing are occupying a changed operative position.

Fig. 3 is a section on the line 3—3 of Fig. 1.

Fig. 4 is an end elevation of the casing, and

Fig. 5 is a diagrammatic plan showing the manner of applying the attachment to the body or chassis of a motor vehicle.

Referring to the drawings:—

1 represents a casing which contains the principal operating parts of the device and is provided with an attachable side 2.

Movable endwise through the chamber of the casing at the top, with extension through its opposite ends, is a slide 3. This slide comprises parallelly-arranged side bars 4 and 5 respectively, which are the parts slidable upon and through the opposite ends of the casing. The opposite ends of the casing where the bars extend through it are preferably provided with butts 7 which provide bearings on which the respective bars 4 and 5 may slide. The bars 4 and 5 of the slide have extension beyond the opposite ends of the casing and at their front ends the bars are connected by an integral end connection 8. At their rear ends the bars are connected by a cross bar 9 which is fastened to small blocks 10 attached to the respective bars 4 and 5 by binding screws 11.

Attached to the front end connection 8 of the slide is a coiled spring 12, and to the cross bar at the rear end of the slide is attached a coiled spring 13. The spring 12 is heavier or stronger spring than the spring 13.

Carried by the slide 3 and located on that portion thereof lying within the chamber of the casing is a flexible finger 14. This finger comprises parallelly-arranged spaced sides 15, 15 pivotally hung from a cross pin 16, which is fixed at its opposite ends to small blocks 17 strung upon the respective bars 4 and 5 of the slide and secured to them by binding screws 18. The sides 15, 15 of the finger are connected by cross pins 19 and 20, respectively, of which the pin 19 is arranged about midway the sides and the pin 20 at the forward end thereof. Each of the pins 16, 19 and 20 is covered with a sleeve 21 of some insulating material.

Thus formed and arranged, the finger 14 will hang loosely from the slide. It is held, however, in a forward obliquely-inclined position by a stop 22 carried by its respective sides 15, which has drawing engagement with the upper surfaces of the bars 4 and 5 of the slide as the finger moves to a downturned gravitated position. From this obliquely-inclined position, which is its normal position, the finger is free to swing with a forward and upward movement, returning, however, to its normal inclined position when released from any force acting to lift it.

The slide 3 has a limited movement which is defined by the engagement of the blocks 17 on the rods 4 and 5 with the butt 7 on the left of the casing. Its forward movement is limited and defined by the engagement of the stop 22 on the finger 14 with the butt 7 on the right of the casing when the slide is moved forward. The slide is freely movable between the limits thus defined. Its normal position is a retracted position, being thus retained by the tension of the spring 13, as will later be explained.

Attached to and extending from the rear side of the casing, at right angles to it, are a number of posts 23, 24 and 25, respectively. Each of these posts is insulated from the body of the casing and this effect is preferably obtained for each post by providing the back plate of the casing with cups 26 each lined with an insulating bushing 27. Each of the posts 23, 24 and 25 is provided with a collar 28 which bears against the insulating bushing contained in one of these cups, and is provided also with a contracted end portion 29 which extends through the insulating bushing and through the end of the cup but out of contact with the cup and back plate of the casing, and is secured by a nut 30 which bears against the outer face of the cup outside the casing, an insulating washer 31 being interposed between the nut and the outside face of the cup or plate. Thus each of the posts 23, 24 and 25 is fastened to the casing and each insulated therefrom.

The posts 23 and 24 form part of an electric connection, as will presently be explained, and secured to these posts are circuit wires 32 and 33 respectively, each wire being secured in the usual manner by a binding nut 34 to the casing.

35 is a switch member generally segmental in form. It comprises a hub portion 36 from which projects a semi-circular disk-like body portion 37 having a rim 38. The member is hung to turn on the post 23 which extends through the hub of the member, and the member is retained by a nut 39 on the end of the post. The switch member 35 normally occupies a gravitated position as shown in Fig. 1 with the upper front surface of its body bearing against a fixed insulated pin 41 projecting from the side of the casing. The switch member is held to contact with the pin 41 acting as a stop by the overweighting of the rear half of the member or that portion thereof which lies to the rear or back of the axial centre of the member when positioned as aforesaid. Extending from the body of the member and hub on the upper side of the member when occupying its normal position is a projection 42 presenting an edge 43. When the switch member is occupying its normal position as aforesaid the edge 43 of the projection 42 on the member will lie just forward of the end of the finger 14 when occupying its retracted position on the casing as above explained. In other words, the face 43 will lie just in front of the cross bar 20 on the end of the finger so that as the finger is moved forward by the forward projection of the slide the cross bar 20 will engage the edge of the projection 42 and thereby, if the movement of the slide be continued, the finger will operate to turn the switch member in a clockwise direction. If the forward movement of the slide be a moderate movement as differentiated from a quick energetic throw it will operate through the finger to turn the switch member only slightly when the finger will slip off or by the end of the projection 42, whereupon the switch member will be released to turn back to its normal underslung position as shown in Fig. 1. At such time the finger 14 may have been moved to the forward end of the casing or where its top 22 is contacting with the butt 7 on the right of the casing which limits the forward movement of the slide and finger as above explained. From this position, with the switch member occupying its normal position, the finger may be moved back by the slide to its initial retracted position and during this movement will simply idle over the projection 42 which will tend to lift the finger, after which the finger will gravitate to its normal obliquely-inclined position as shown in Fig. 1. On the other hand, with the switch member in its normal underslung position, if the forward movement or throw of the slide be a very quick energetic movement, then the striking of the finger 14 carried by the slide against the projection 42 will tend not only to turn the switch member in a clockwise direction, but throw it into an overslung position beyond its dead centre with relation to the axis on which it is turning and into the position shown in Fig. 2, when the overweighted side of the member will be brought to bear against the pin 41 acting as a stop. Here the switch member will remain until turned back, owing to the fact that the overweighted side of the member is contacting with the pin. The switch member is thrown over into the position shown in Fig. 2 on quick movement of the slide by reason of the blow effected by the finger on account of the inertia of the switch member which is preferably made a member of some considerable weight. After the switch member has been thrown over into the position shown in Fig. 2 the finger will have been moved to the end of its forward movement as limited by the butt 7 on the right of the casing, and here it will remain until the slide is released. Upon the release of the slide the finger will be carried back and during such movement will engage the edge 44 of a projection 45 on the rim of the switch member, and thereby will turn the switch member in a counter-clockwise direction, when it will gravitate back to its initial or normal position as shown in Fig. 1, the slide and finger also returning to assume their initial retracted positions.

Fixed to the hub of the switch member is a contact 50. Extending beneath this contact is the arm 51 of a lever 52 having a hub 53 on which the lever is mounted to turn on the post 24 of those secured to the casing. The arm 51 of the lever 52 is yieldingly retained, as will presently be explained, to receive the engagement of the contact 50 on the hub of the switch member, but the form and arrangement of the contact and also that of the lever are such that the contact will only have engagement with the arm of the lever when the switch member has been turned into an overslung position with respect to its axis, as explained above, and especially when the switch member is occupying and maintaining an overslung position as shown in Fig. 2.

The lever 52 is yieldingly maintained so that the contact 50 on the switch member will have and maintain engagement with its arm 51 by means of an auxiliary lever 54 having a hub 55 by which it is mounted to pivot or turn on the post 25 of those secured to the side of the casing. The lever 54 is provided with a relatively long weighted arm 56 underlying the arm 51 of the lever 52, a relatively short arm 57 which has drawing engagement with an arm 58 on the lever 52 and a stop arm 59 on the end of the arm 56 which is turned to overlap the end of the lever arm 51 of the lever 52. With the parts thus arranged, the lever 54 operates upon the lever 52 to yieldingly maintain its arm 51 in proper position to receive the engagement of the contact 50 without the use of a spring, which is to be desired in this connection.

In the application of the attachment to a motor vehicle, reference will first be made to certain of the common parts of the vehicle in connection with which the attachment is used. Referring to Fig. 5, in which these parts are diagrammatically shown, 65 represents the body or chassis of the vehicle, 66 the storage battery commonly employed with the vehicle, 67 the horn and 68 the push button usually employed on the steering wheel of the vehicle for sounding the horn. 69 and 70 represent, respectively, wire connections leading from the storage battery through the push button and thence to the horn, the horn being sounded in the usual way by pressure brought to bear upon the push button. That is, the present attachment does not interfere with the ordinary process of manually sounding the horn by means of a push button.

Further referring to the parts shown diagrammatically in Fig. 5, 71 represents the clutch pedal and 72 the arm of the lever carrying this pedal. 73 is the pedal which operates the footbrake and 74 is the arm of the lever carrying this pedal. As the clutch is thrown out or the footbrake applied, in either instance the pedals 71 and 73 will be thrown forward as also the levers bearing these pedals.

The casing 1 of the attachment lies beneath the floor boards of the vehicle and is fixed thereto in any suitable manner. The spring 12 is attached by any suitable connection 75 to the arm 74 which carries the pedal for operating the footbrake. The spring 13 of the attachment is secured by any suitable connection 76 to the chassis of the vehicle. The arrangement of the parts is also such that the slide 3 and finger 14 carried by it will have been moved to and will be maintained by the tension of the spring 13 in their normal retracted positions as above explained.

The wire 32 connecting with the post 23 of the attachment is put in circuit with the battery while the arm 33 connecting with the post 24 of the attachment is put in circuit beyond the push button with the horn.

The operation is as follows: During the ordinary movements of applying the footbrake by depressing the pedal 73 the slide 3 will be thrown forward through the casing, but the finger 14 carried by it will simply idle over the switch member 35 causing slight turning thereof but no such rotation as will establish engagement between the contact 50 on the switch member and the arm 51 of the lever 52 inside the casing. In case, however, the footbrake is quickly and forcibly applied thereupon the forward projection of the slide will cause the finger to throw the switch member into its overslung position as shown in Fig. 2 where, as previously explained, the contact 50 carried by the switch member will have engagement with the arm 51 of the lever 52. Thereupon an electric current will be established between the battery and the horn, the circuit passing through the wires 69, 32 to the post 23, thence through the switch member 35, lever 52 and post 24, and thence through wires 33, 70 to the horn. The horn will continue to sound as long as the food pedal, which controls the brake, is held down. Upon a slight release of the brake pedal the spring 13 of the attachment will retract the slide and finger carried by it to their normal retracted positions, the finger then acting to return the switch member to its normal position, and thereupon the circuit will become broken.

The spring 12 is provided in the connection leading from the brake lever arm to the forward end of the slide in order that it may compensate for any further movement of the lever after the slide has been drawn forward to the limit of its forward extension with relation to the casing.

Instead of attaching the connection leading from the forward end of the slide to the lever arm carrying the footbrake pedal it may be attached, if so desired, with substantially the same effect to the lever arm carrying the clutch pedal. In other words, with such an arrangement the horn would be sounded in case the clutch was quickly and forcibly thrown out. Ordinarily the clutch pedal is depressed but slightly in the ordinary release of the clutch, but in case of emergency the clutch pedal is usually forcibly depressed to the limit of its throw. In fact, the attachment might be connected to both the lever arm carrying the footbrake and that carrying the clutch, though it is preferred that the attachment be connected only to the lever arm carrying the pedal for operating the footbrake.

Having thus fully described my invention, I claim and desire to secure by Letters Patent of the United States:—

1. In a motor vehicle having a foot brake the combination comprising a warning signal, means for actuating the signal, and means co-operating between the foot brake mechanism of the vehicle and the signal actuating means whereby a relatively slow application of the brake leaves the signal unaffected and whereby a relatively rapid application of the brake causes the signal to be operated.

2. In a motor vehicle having a foot brake the combination comprising a warning signal, electrical means for actuating the signal comprising an electric circuit having in it a movable switch for making or breaking the circuit, and means co-operating between the foot brake mechanism and the switch whereby a relatively slow application of the brake leaves the switch in position for opening the circuit and the signal unaffected and whereby a relatively rapid application of the brake causes the switch to close the circuit and the signal to be operated.

3. In a motor vehicle having a foot brake the combination comprising a warning signal, electrical means for actuating the signal comprising an electric circuit having in it a movable switch for making or breaking the circuit, mechanism having a forward and reverse movement controlled by the brake for moving the switch member and co-operating therewith in a manner whereby a relatively slow application of the foot brake leaves the switch in position for opening the circuit and the signal unaffected and whereby a relatively rapid application of the brake causes the switch to close the circuit and the signal to be operated.

4. In a motor vehicle having a foot brake the combination comprising a warning signal, electrical means for actuating the signal comprising an electric circuit having in it a movable switch for making or breaking the circuit, said switch being adapted and arranged whereby it when pivotally mounted will assume a normal underslung position with relation to its mounting for opening the circuit and a determinate overslung position for closing the circuit, means for pivotally mounting the switch, and means co-operating between the foot brake mechanism and the switch whereby a relatively slow application of the brake will leave the switch unaffected for closing the circuit and whereby a relatively rapid application of the brake causes the switch to be moved into its determinate overslung position to close said circuit and the signal to be operated.

5. In a motor vehicle having a foot brake the combination comprising a warning signal, electrical means for actuating the signal comprising an electric circuit having in it a movable switch for making or breaking the circuit, said switch being adapted and arranged whereby it when pivotally mounted will assume a normal underslung position with relation to its mounting for opening the circuit and a determinate overslung position for closing the circuit, means for pivotally mounting the switch, mechanism having a forward and reverse movement controlled by the brake and co-operating with the switch in a manner whereby a relatively slow application of the brake leaves the switch in position for opening the circuit and the signal unaffected and whereby a relatively rapid application of the brake causes the switch to close the circuit and the signal to be operated, said mechanism co-operating also with the switch whereby it will return the switch from its determinate overslung position for closing the circuit to its normal underslung position for opening the circuit on the release of the brake.

WILLIAM A. PERVIER.